United States Patent
Jeon et al.

(10) Patent No.: US 7,848,435 B2
(45) Date of Patent: Dec. 7, 2010

(54) NXN MULTIPLE-INPUT MULTIPLE-OUTPUT TRANSCEIVER

(75) Inventors: Sang-yoon Jeon, Seoul (KR); Hee-mun Bang, Seoul (KR); Sung-jae Jung, Seoul (KR); Heung-bae Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1098 days.

(21) Appl. No.: 11/543,120

(22) Filed: Oct. 5, 2006

(65) Prior Publication Data

US 2007/0098105 A1   May 3, 2007

(30) Foreign Application Priority Data

Nov. 2, 2005   (KR) .................. 10-2005-0104377

(51) Int. Cl.
*H04L 1/02* (2006.01)
(52) U.S. Cl. .................. 375/260; 455/73; 455/147; 455/208
(58) Field of Classification Search .......... 375/260; 455/78, 73, 86, 88, 146, 147, 208
See application file for complete search history.

(56) References Cited

U.S. PATENT DOCUMENTS

| | | | |
|---|---|---|---|
| 2003/0203743 A1* | 10/2003 | Sugar et al. | 455/550.1 |
| 2004/0106441 A1* | 6/2004 | Kazakevich et al. | 455/574 |
| 2005/0064892 A1* | 3/2005 | Cavin | 455/550.1 |
| 2006/0063494 A1* | 3/2006 | Zhang et al. | 455/78 |
| 2006/0109927 A1* | 5/2006 | Magee et al. | 375/267 |

OTHER PUBLICATIONS

Rogers, J.W.M, Dai, F.F, Cavin, M.S, Rahn, D.G, "A multiband ΔΣfractional-N frequency synthesizer for a MIMO WLAN transceiver RFIC", Solid-State Circuits, IEEE Journal, Mar. 2005.*

* cited by examiner

*Primary Examiner*—Chieh M Fan
*Assistant Examiner*—Aristocratis Fotakis
(74) *Attorney, Agent, or Firm*—Sughrue Mion, PLLC (57) ABSTRACT

An N×N multiple-input multiple-output (MIMO) transceiver is provided. The transceiver includes a plurality of transceivers, each including at least one transceiver circuit; an oscillation unit which is configured to generate a differential signal which is supplied to the at least one transceiver circuit; a plurality of buffers, which are mounted in a bypass line between the at least one transceiver circuit and the oscillation unit and are configured to amplify and bypass the differential signal or input and amplify the differential signal; and a buffer control unit which is configured to control the plurality of buffers to bypass or input the differential signal.

13 Claims, 5 Drawing Sheets

NXN MULTIPLE-INPUT MULTIPLE-OUTPUT TRANSCEIVER

CROSS-REFERENCE TO RELATED APPLICATION

This application claims priority from Korean Patent Application 10-2005-0104377, filed on Nov. 2, 2005, the entire contents of which are incorporated herein by reference.

BACKGROUND OF THE INVENTION

1. Field of the Invention

Apparatuses consistent with the present invention relate to an N×N multiple-input multiple-output (MIMO) transceiver, and more particularly, to an N×N MIMO transceiver capable of supplying a differential signal to plural transceivers by using one frequency synthesizer.

2. Description of the Related Art

With the spread of high-speed Internet, digital home networks are built in combination with high-speed internet networks such as digital subscriber line (DSL) and wireless local area networks, and, as high-capacity audio-visual (AV) multimedia services such as high definition class (HD-class) broadcasts increase, wireless communication technologies are required which have stable and high throughput such as throughput in excess of 100 Mbps.

Accordingly, the requirements of IEEE 802.11n, 16a/e, 20, and so on, which are the next-generation radio frequency (RF) standard have become more specific, and, in particular, it is necessary to develop a low-cost and low-power complementary metal oxide semiconductor (CMOS) RF solution to cope with the IEEE 802.11n.

To cope with such requirements, MIMO technologies have been proposed. The MIMO technologies are to connect plural transceivers each formed in one chip with a transmitter part and a receiver part, and the MIMO transceiver performs processing over plural signals so that the plural signals are transmitted through plural antennas at the same time, or processes plural signals input through individual antennas at the same time. Each receiver circuit included in the MIMO transceiver downconverts to baseband an RF signal input to a corresponding antenna thereof, and upconverts a baseband signal for transmissions to a corresponding antenna thereof.

The early MIMO transceiver used a pair of connected transceivers, which has no way to reduce the cost of the transceiver. Thus, there are proposed methods, some of which integrate a power amplifier into a transceiver or use one frequency synthesizer.

U.S. patent application Publication No. 2004/0121753, entitled "Multiple-Input Multiple-Output Radio Transceiver" discloses an MIMO transceiver using one frequency mixer. The frequency synthesizer includes voltage controlled oscillators (VCOs) and a phase locked loop (PLL). The VCO generates and supplies a differential signal of a certain frequency to the mixer, so that received data are down converted into a baseband frequency. Further, the PLL synchronizes a phase of a differential signal in order for the differential signal output from the VCO to stay at a certain phase angle.

However, such conventional methods and apparatuses can be designed to use one frequency synthesizer by applying a pair of receiver circuits and a pair of transmitter circuits to the MIMO transceiver of a 2×2 type, but the 4×4 to N×N MIMO transceivers, each having more than two pairs of receiver circuits and transmitter circuits, cannot employ a structure in which one frequency synthesizer is used.

Therefore, approaches are sought which cope with throughput requirements together with advancements of communications technologies, by applying one frequency synthesizer to the N×N MIMO transceiver.

SUMMARY OF THE INVENTION

The present invention provides an N×N MIMO transceiver capable of supplying a differential signal to plural transceivers by using one frequency synthesizer.

According to an aspect of the present invention, there is provided an N×N MIMO transceiver which comprises a plurality of transceivers, each comprising at least one transceiver circuit; an oscillation unit which is configured to generate a differential signal which is supplied to the at least one transceiver circuit; a plurality of buffers, which are mounted in a bypass line between the at least one transceiver circuit and are configured to amplify and bypass bypassing the differential signal or input and amplify the differential signal; and a buffer control unit which is configured to control the plurality of buffers to bypass or input the differential signal.

The buffer control unit may control the plurality of buffers to bypass or input the differential signal depending on whether or not the oscillation unit operates.

The differential signal may be externally bypassed.

The plurality of transceivers can be built with 1×1 MIMO transceivers, respectively, each having one transceiver circuit.

The plurality of transceivers can be built with 2×2 MIMO transceivers, respectively, each having a pair of transceiver circuits.

The plurality of buffers may include an output buffer which is mounted in a bypass line between the transceiver circuit and the oscillation unit and which is configured to bypass the differential signal, and an input buffer which is connected in parallel with the output buffer and is configured to input the differential signal.

The input buffer may be configured to externally input the differential signal.

The oscillation unit may be a VCO, and, out of the plurality of transceivers, the VCO of only one of the plurality of transceivers operates.

The buffer control unit of the transceiver in which the VCO operates may stop operation of the input buffer of the transceiver in which the VCO operates, and the buffer control units of the remaining transceivers in which the VCO does not operate may stop operation of their respective output buffers.

The differential signal of the VCO may be provided to transceiver circuits of the remaining transceivers in which the VCO does not operate through the output buffer of the transceiver in which the VCO operates and through the input buffer of the transceiver in which the VCO does not operate.

On a path connecting the VCO and the transceiver circuits, a buffer switch may be mounted between the output buffer and the input buffer and is configured to turn on and off the VCO and to turn on and off the input of the differential signal to the transceiver circuits.

The buffer control unit of the transceiver in which the VCO operates may operate the input buffer and the output buffer of the transceiver in which the VCO operates and may turn off the buffer switch of the transceiver in which the VCO operates, and the buffer control units of the remaining transceivers in which the VCO does not operate may stop operation of their respective output buffers and may turn off their respective buffer switches.

The differential signal of the VCO may be amplified through the output buffer and input buffer of the transceiver in which the VCO operates, and may be provided to the transceiver in which the VCO operates.

According to another aspect of the present invention, there is provided an N×N MIMO transceiver which comprises a first MIMO transceiver comprising at least one transceiver circuit, an oscillation unit which is configured to generate a differential signal supplied to the transceiver circuit, and a plurality of buffers which are mounted in a bypass line between the transceiver circuit and the oscillation unit and are configured to amplify and bypass the differential signal; and a second MIMO transceiver comprising a buffer which receives the differential signal bypassed by the buffer of the first MIMO transceiver, and at least one transceiver circuit which receives the differential signal from the buffer.

The differential signal may be amplified before the differential signal is received form the buffer.

BRIEF DESCRIPTION OF THE DRAWINGS

The above and other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Hereinafter, description will be made in detail of exemplary embodiments of the present invention with reference to the accompanying drawings.

Figure 1:
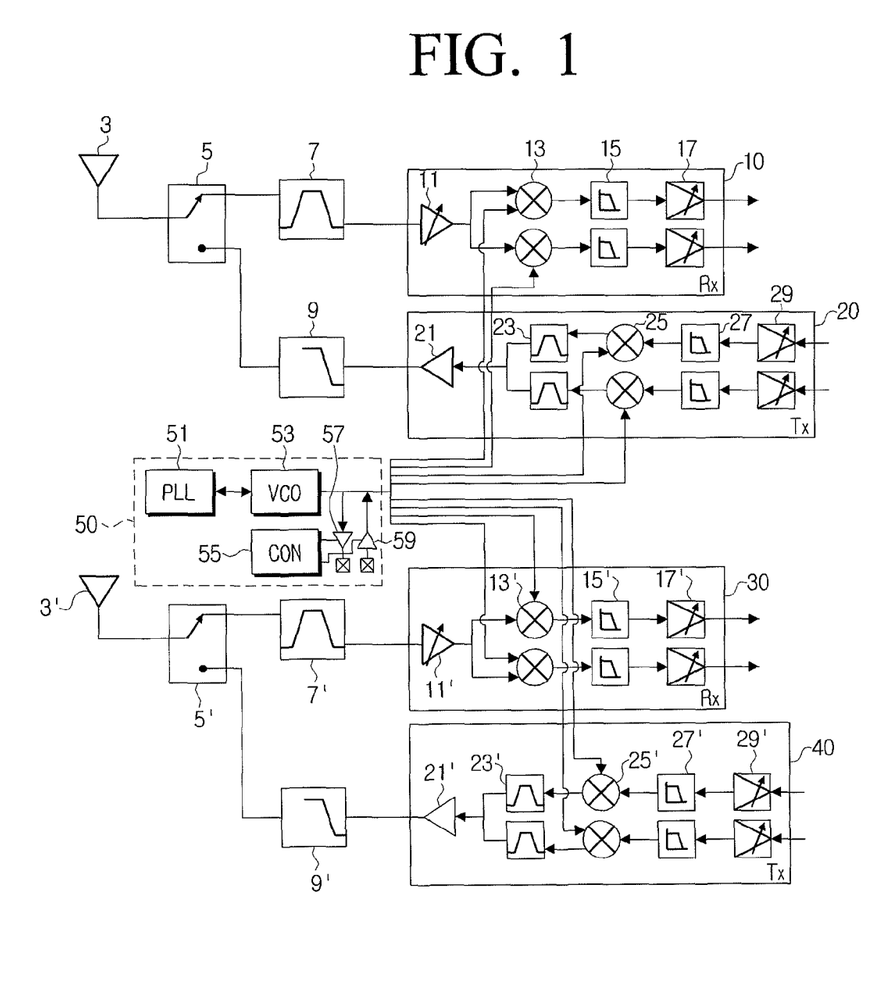
FIG. 1 is a circuit diagram for showing a 2×2 MIMO transceiver according to an exemplary embodiment of the present invention.

FIG. 1 is a circuit diagram for showing a 2×2 MIMO transceiver according to an exemplary embodiment of the present invention. As shown in FIG. 1, the 2×2 MIMO transceiver has a pair of antennas 3 and 3', a pair of transceiver switches 5 and 5', a pair of band pass filters 7 and 7', a pair of low pass filters 9 and 9', a pair of receiver circuits 10 and 30, a pair of transmitter circuits 20 and 40, and a frequency synthesizer 50.

Each antenna 3 or 3' is shared by a respective pair of the transmitter and receiver circuits. For example, antenna 3 is shared by receiver circuit 10 and transmitter circuit 20. Each antenna 3 or 3' thus receives and provides an RF signal to its corresponding receiver circuit 10 or 30, or transmits an RF signal output from its corresponding transmitter circuit 20 or 40 output The RF signal may be received from an external source.

The transceiver switch 5 or 5' is mounted between the antennas and the transmitter circuits 20 and 40 and the receiver circuits 10 and 30, respectively. For example, the transceiver switch 5 is mounted between antenna 3, and transmitter circuit 20 and receiver circuit 10. The transceiver switch 5 or 5' is used to select between an RF signal received and an RF signal output from the transmitter circuits 20 or 40.

The band pass filters 7 and 7' are mounted between the transceiver switches 5 and 5', respectively, and the receiver circuits 10 and 30, respectively, and the band filters provide RF signals input from the antennas 3 and 3' to the respective receiver circuits 10 and 30, and the low pass filters 9 and 9' are mounted between the transceiver switches 5 and 5', respectively, and the transmitter circuits 20 and 40, respectively, and the low pass filters provide RF signals from the transmitter circuits 20 and 40 to the antennas 3 and 3', respectively.

The receiver circuits 10 and 30 each have an LNA 11,11', a pair of down mixers 13,13', a pair of filters 15,15', and a pair of variable gain amplifiers 17,17'.

The pair of down mixers 13 receive data signals amplified through the LNA 11, and use differential signals provided from the frequency synthesizer 50 to remove carrier signals from the data signals and generate I signals and Q signals which are down converted to baseband.

The transmitter circuits 20 and 40 each have a pair of variable gain amplifiers 29,29', a pair of filters 27,27', a pair of up mixers 25,25', a pair of bandpass filters 23,23', and a power amplifier 21,21'.

The pair of up mixers 25 use differential signals provided from the frequency synthesizer 50 to upconvert baseband data signals into RF signals or intermediate frequency (IF) signals.

The frequency synthesizer 50 has a VCO 53, a PLL 51, and a buffer controller 55. Optionally, an output buffer 57 and an input buffer 59 may be provided.

The VCO 53 generates a differential signal of a certain frequency, and the frequency of a differential frequency generated from the VCO 53 is the same as a center frequency of a data signal. The differential signal from the VCO 53 is provided to the down mixers 13 of the receiver circuits 10 and 30 and the up mixers 25 of the transmitter circuits 20 and 40. The down mixers 13 are used to downconvert data signals to baseband, and the up mixers 25 are used to upconvert data signals into an RF or an IF band.

The PLL 51 is a phase-synchronizing circuit for synchronizing a differential signal phase in order for a differential signal of the VCO 53 to maintain a certain phase angle.

If the output buffer 57 is used as the N×N MIMO transceiver with plural 2×2 MIMO transceivers connected thereto, the output buffer 57 is used to amplify and provide a differential signal of the VCO 53 to other 2×2 MIMO transceivers. The input buffer 59 is used to amplify again and provide the differential signal amplified through the output buffer 57 to the other 2×2 MIMO transceivers. The output buffer 57 and the input buffer 59 are mounted in parallel with each other for bypassing between the respective receiver circuits 10 and 30 or the respective transmitter circuits 20 and 40.

The buffer controller 55 controls the operations of the output buffer 57 and the input buffer 59 depending on whether to directly receive a differential signal from the VCO 53 having an MIMO transceiver mounted thereto or receive a differential signal from other 2×2 MIMO transceivers.

For example, if a first transceiver directly receiving a differential signal from the VCO 53 is connected to a second transceiver receiving a differential signal from the first transceiver, the buffer controller 55 of the first transceiver turns on the operations of the output buffer 57 and turns off the operations of the input buffer 59. However, the buffer controller 55 of the second transceiver turns off the operations of the output buffer 57 and turns on the operations of the input buffer 59. (Note that FIG. 1 shows only one transceiver.)

The frequency synthesizer 50 of the present exemplary embodiment is constructed to include all the VCO 53, PLL 51, input buffer 59, and buffer controller 55 in order for a 2×2 MIMO transceiver formed in one chip to be fabricated by one design. However, if each design is provided on a different chip, then in the above exemplary embodiment, the first transceiver can be designed without the input buffer 59 if the first transceiver directly receives a differential signal from the VCO 53, and the second transceiver can be designed without the VCO 53, PLL 51, and input buffer 59 in case of the second transceiver.

Figure 2:
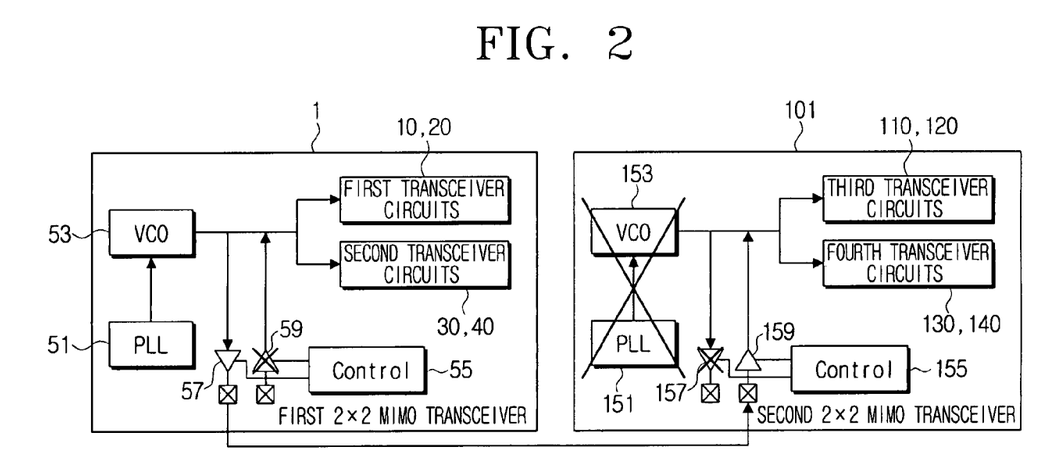
FIG. 2 is a circuit diagram for showing a 2×2 MIMO transceiver according to a first exemplary embodiment of the present invention.

FIG. 2 is a circuit diagram for showing a 4×4 MIMO transceiver according to a first exemplary embodiment of the present invention. As shown in FIG. 2, the 4×4 MIMO transceiver is constructed with first and second 2×2 MIMO transceivers 1 and 101 connected together. The first exemplary embodiment of the present embodiment is shown in FIG. 2 with only the frequency synthesizer 50 and the respective transceiver circuits 10 and 20, 30 and 40, 110 and 120, and 130 and 140 so that the structure of the 4×4 MIMO transceiver can be more easily understood.

The first 2×2 MIMO transceiver 1 has a frequency synthesizer including a VCO 53, PLL 51, input buffer 59, and output buffer 57, and the first transceiver circuits 10, 20 and the second transceiver circuits 30, 40. It should be understood that first transceiver circuits 10,20 comprises a transmitter circuit 20 and a receiver circuit 10, and second transceiver circuits 30, 40 comprises a transmitter circuit 40 and a receiver circuit 30.

Like the first 2×2 MIMO transceiver 1, the second 2×2 MIMO transceiver 101 has a VCO 153, PLL 151, input buffer 159, output buffer 157, buffer controller 155, third transceiver circuits 110, 120, and fourth transceiver circuits 130, 140.

The first 2×2 MIMO transceiver 1 and the second 2×2 MIMO transceiver 101 are connected so that a differential signal can be commonly used. In order that the differential signal may be commonly used, the output buffer 57 of the first 2×2 MIMO transceiver 1 and the input buffer 159 of the second 2×2 MIMO transceiver 101 are connected on the printed circuit board (PCB). The output buffer 57 of the first 2×2 MIMO transceiver 1 and the input buffer 159 of the second 2×2 MIMO transceiver 101 are wire-bonded and connected with each other on the PCB.

If all the first and second 2×2 MIMO transceivers operate, such a 2×2 MIMO transceiver provides a differential signal to the first and second 2×2 MIMO transceivers 1 and 101 through paths as below.

For example, if RF signals are input to and processed in the receiver circuits of the first to fourth transceiver circuits 10, 20; 30, 40; 110, 120; and 130, 140, a differential signal may be provided from the VCO 53 to the down mixers 13 of the first to fourth transceiver circuits 10, 20; 30, 40; 110, 120; and 130, 140.

If so, the buffer controller 55 of the first 2×2 MIMO transceiver 1 turns off the operations of the input buffer 59, and the buffer controller 155 of the second 2×2 MIMO transceiver 101 turns off the operations of the output buffer 157. Further, if a differential signal is generated from the VCO 53 of the first 2×2 MIMO transceiver 1, the differential signal is provided to the down mixers 13 of the first transceiver circuits 10, 20 and the second transceiver circuits 30, 40.

Simultaneously, the differential signal of the VCO 53 is amplified at the output buffer 57 of the first 2×2 MIMO transceiver 1, and amplified once more at the input buffer 159 of the second 2×2 MIMO transceiver 101, and then provided to the down mixers 13 of the third transceiver circuits 110, 120 and 130, 140. Thus, the first 2×2 MIMO transceiver 1 and the second 2×2 MIMO transceiver 101 can receive the differential signal by using one frequency synthesizer 50.

Figure 3:
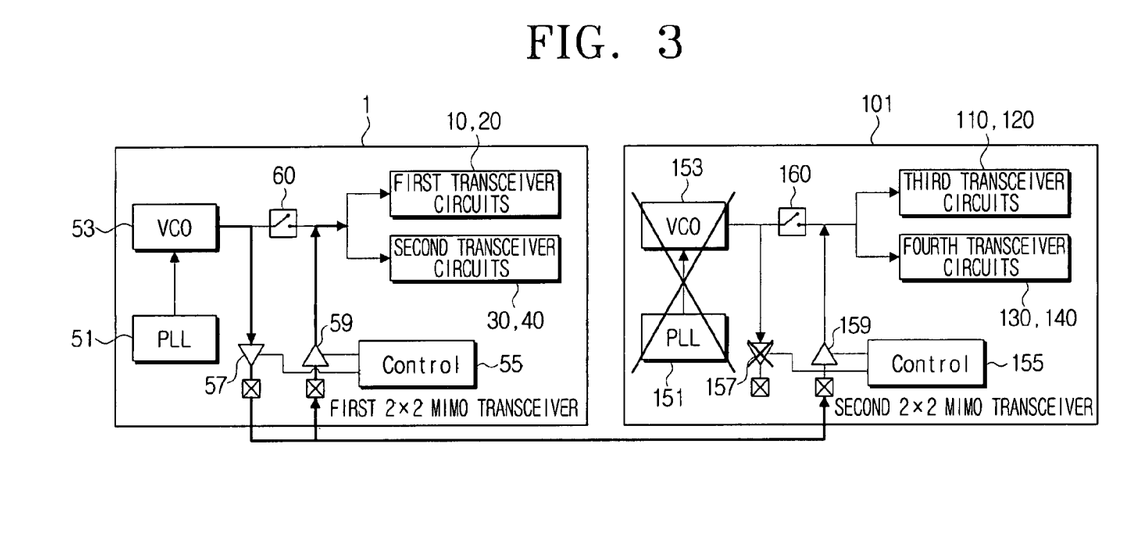
FIG. 3 is a circuit diagram for showing a 4×4 MIMO transceiver according to a second exemplary embodiment of the present invention.

FIG. 3 is a circuit diagram for showing a 4×4 MIMO transceiver according to a second exemplary embodiment of the present invention. As shown in FIG. 3, the 4×4 MIMO transceiver has nearly the same structure as the 4×4 MIMO transceiver of FIG. 2. That is, the 4×4 MIMO transceiver of the second exemplary embodiment has buffer switches 60 or 160 between the input buffers 59 and 159, respectively, and the output buffers 57 and 157, respectively, of the first and second 2×2 MIMO transceivers 1 and 101, respectively.

Each buffer switch 60 or 160 turns on or off the connection between the input buffer 59 or 159 and the output buffer 57 or 157, respectively, and, in the first 2×2 MIMO transceiver 1, turns off the connection between the input buffer 59 and the output buffer 57 so that a differential signal of the VCO 53 is input to the first and second transceiver circuits 10, 20 and 30, 40 through the input buffer 59 of the first 2×2 MIMO transceiver 1 and the output buffer 57 of the first 2×2 MIMO transceiver 1. On the contrary, in the second 2×2 MIMO transceiver 101, like in the above exemplary embodiment, the supply of a differential signal is not affected with the buffer switch 160 turned on or off since the VCO 153, PLL 151, and input buffer 159 do not operate, but it is advantageous if the buffer switch 160 is turned off for noise cutoff.

Thus, the buffer controller 55 of the first 2×2 MIMO transceiver 1 turns off the buffer switch 60 if the first and second transceiver circuits 10, 20 and 30, 40 operate. On the contrary, the buffer controller 155 of the second 2×2 MIMO transceiver 101 turns off the buffer switch 160, and, like in the first exemplary embodiment, turns off the operations of the output buffer 157.

Description will now be made below on the operation of the 4×4 MIMO transceiver according to the second exemplary embodiment as above.

For example, if the transmitter circuits of the first and/or second transceiver circuits 10, 20 and/or 30, 40 and the transmitter circuits of the third and/or fourth transceiver circuits 10, 20 and/or 130, 140 operate, the buffer controller 55 of the first 2×2 MIMO transceiver 1 turns off the buffer switch 60. Further, the buffer controller 155 of the second 2×2 MIMO transceiver 101 stops the operation of the output buffer 157 and turns off the buffer switch 160.

If the VCO 53 and PLL 51 of the first 2×2 MIMO transceiver 1 operate in the above state, a differential signal of the VCO 53 is amplified through the output buffer 57 of the first 2×2 MIMO transceiver 1, and amplified again through the input buffer 59 of the first 2×2 MIMO transceiver 1, so as provide the differential signal to the up mixers 25 of the first and/or second transceiver circuits 10, 20 and/or 30, 40.

Simultaneously, the differential signal amplified through the output buffer 57 of the first 2×2 MIMO transceiver 1 is amplified through the input buffer 159 of the second 2×2 MIMO transceiver 101, and provided to the up mixers of the third and/or fourth transceiver circuits 110, 120 and/or 130, 140.

The use of the buffer switch 60 as above is to compensate for a phase difference of a differential signal due to a distance difference between the first 2×2 MIMO transceiver 1 and the second 2×2 MIMO transceiver 101 when the differential signal is delivered. Therefore, the phase offset can be reduced due to the use of the buffer switches 60 and 160.

Figure 4:
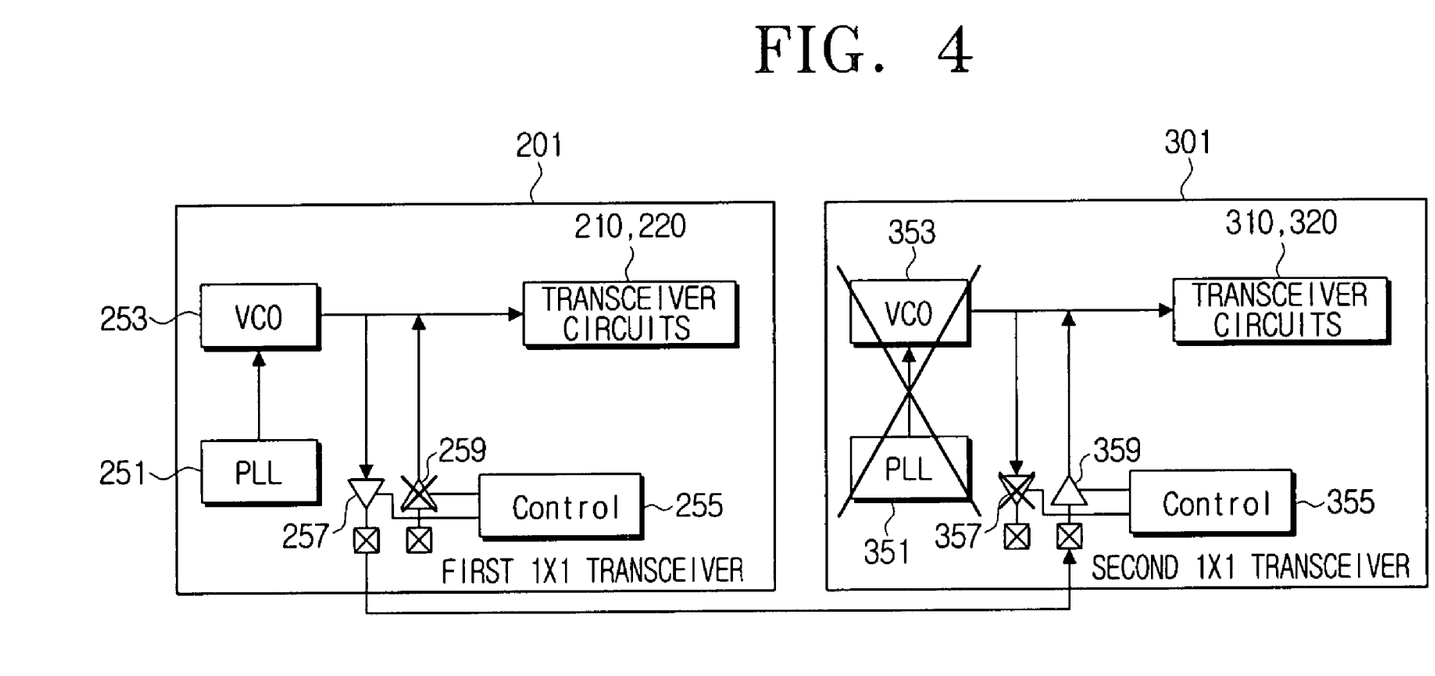
FIG. 4 is a circuit diagram for showing a 2×2 MIMO transceiver according to a third exemplary embodiment of the present invention.

FIG. 4 is a circuit diagram for showing a 2×2 MIMO transceiver according to a third exemplary embodiment of the present invention. As shown in FIG. 4, the 2×2 MIMO transceiver is built with a pair of general 1×1 MIMO transceivers connected with each other.

The first 1×1 MIMO transceiver 201 has transceiver circuits 210, 220 and a frequency synthesizer including a VCO 253, PLL 251, input buffer 259, output buffer 257, and a buffer controller 255. The second 1×1 MIMO transceiver 301 has the same structure as the first 1×1 MIMO transceiver 201.

Description will now be made below of the operation of the 2×2 MIMO transceiver according to the third exemplary embodiment of the present invention.

For example, if the receiver circuit of each transceiver circuit operates, the buffer controller 255 of the first 1×1 MIMO transceiver 201 stops the operation of the input buffer 259 of the first 1×1 MIMO transceiver 201, and the buffer controller 355 of the second 1×1 MIMO transceiver 301 stops the operations of the output buffer 357.

Thus, the differential signal of the VCO 253 of the first 1×1 MIMO transceiver 201 is directly provided to the down mixers of the transceiver circuits 210, 220 of the first 1×1 MIMO transceiver 201, and, at the same time, the differential signal is provided to the down mixers of the transceiver circuits of the second 1×1 MIMO transceiver 301 through the output buffer 257 of the first 1×1 MIMO transceiver 201 and through the input buffer 359 of the second 1×1 MIMO transceiver 301.

As above, if the 2×2 MIMO transceiver is built with a pair of 1×1 MIMO transceivers, the transceiver circuits of each transceiver are integrated into one, so the performance and noise characteristics of the circuit can be enhanced.

Like the second exemplary embodiment, the 2×2 MIMO transceiver of the above third exemplary embodiment can have the buffer switch between the input buffer 259 and the output buffer 257.

Figure 5A:
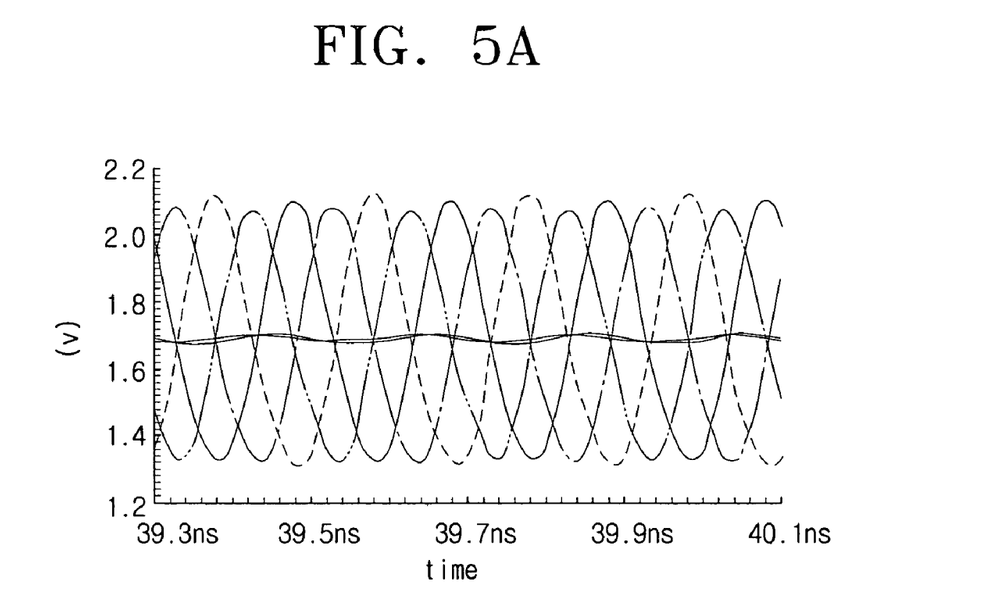
FIG. 5A is a graph for showing differential signals input to transceiver circuits upon operation of the 2×2 MIMO transceiver shown in FIG. 1.
Figure 5B:
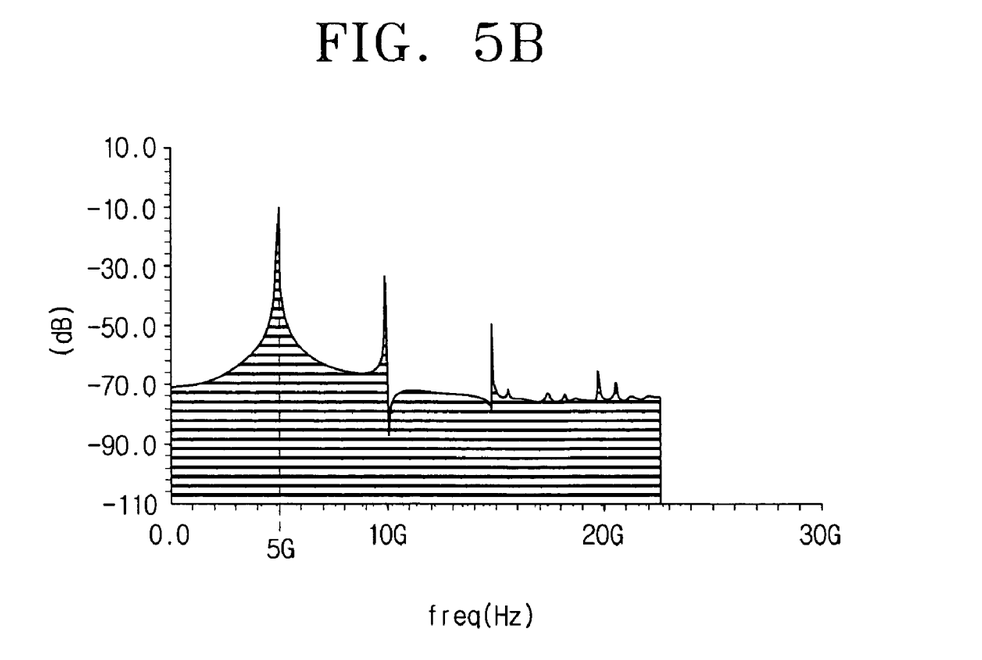
FIG. 5B is a graph for showing an output signal upon operation of the 2×2 MIMO transceiver shown in FIG. 1.

FIG. 5A is a graph for showing differential signals input to the transceiver circuits upon operations of the 2×2 MIMO transceiver shown in FIG. 1, and FIG. 5B is a graph for showing an output signal upon operations of the 2×2 MIMO transceiver shown in FIG. 1. As shown in FIG. 5A, the differential signals has phases of 0°, 90°, 180°, and 270°, and the 2×2 MIMO transceiver generates four differential signals having exactly a 90° phase difference therebetween as in the conventional 2×2 MIMO transceiver.

As shown in FIG. 5B, the 2×2 MIMO transceiver as above has a high output at 5 GHz mainly used for wireless communications, which shows the excellent operation characteristics.

Figure 6A:
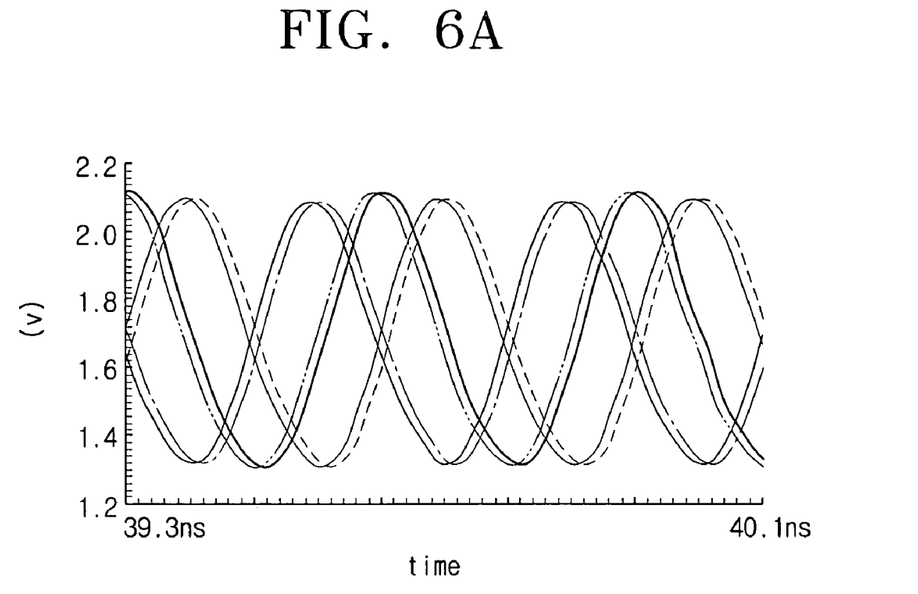
FIG. 6A is a graph for comparing a differential signal input to first and second transceiver circuits with a differential signal input to third and fourth transceiver circuits upon operation of the 4×4 MIMO transceiver shown in FIG. 2.
Figure 6B:
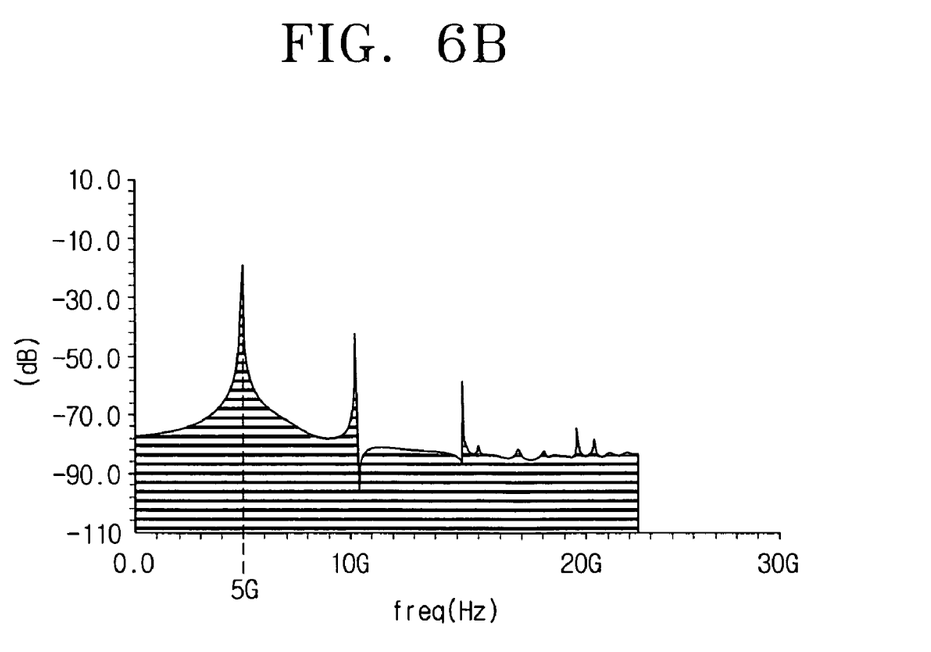
FIG. 6B is a graph for showing an output signal upon operation of the 4×4 MIMO transceiver shown in FIG. 2.

FIG. 6A is a graph for comparing a differential signal input to the first and second transceiver circuits 10, 20 and 30, 40 with a differential signal input to the third and fourth transceiver circuits 110, 120 and 130, 140 upon operations of the 4×4 MIMO transceiver shown in FIG. 2, and FIG. 6B is a graph for showing an output signal upon operations of the 4×4 MIMO transceiver shown in FIG. 2. As shown in FIGS. 6A and 6B, a slight phase different exists between the differential signal input to the first and second transceiver circuits 10, 20 and 30, 40 and the differential signal input to the third and fourth transceiver circuits 110, 120 and 130, 140. Such a phase difference is so insignificant that correction can be performed with the buffer switch 60 mounted in the 2×2 MIMO transceiver shown in FIG. 3.

Like with the 2×2 MIMO transceiver, as shown in FIG. 6B the 4×4 MIMO transceiver as above shows a high output at 5 GHz mainly used for wireless communications, which shows the excellent operation characteristics.

As above, the exemplary embodiments of the present MIMO transceiver use one frequency synthesizer 50 when the 2×2 MIMO transceiver and the 4×4 MIMO transceiver are built, so the power can be reduced which is consumed due to the operations of the VCO 53 when more than one frequency synthesizer 50 is used. Further, if the 1×1 MIMO transceivers constructing the 2×2 MIMO transceiver are each designed in the same structure and the 2×2 MIMO transceivers constructing the 4×4 MIMO transceiver are each designed in the same structure, the N×N MIMO transceiver can be simply built by connecting plural 1×1 MIMO transceivers or 2×2 MIMO transceivers. That is, the MIMO transceivers according to exemplary embodiments of the present invention have an advantage of guaranteeing extendibility and compatibility.

As for the above exemplary embodiments, description has not been made on controls for stopping the operations of the VCO and PLL mounted in the second 2×2 MIMO transceiver 101 or the second 1×1 MIMO transceiver 301, but a controller may be provided for controlling the buffer controller or the transceivers and can fully control such operations. Further, the operations of the VCO mounted in the second 2×2 MIMO transceiver 101 or the second 1×1 MIMO transceiver 301 can be cut off by mechanical cutoff of circuit lines between each transceiver circuit and the VCO mounted in the second 2×2 MIMO transceiver 101 or the second 1×1 MIMO transceiver 301.

Further, the detailed description of certain exemplary embodiments of the present invention should be considered as illustrative, and various changes and modifications can be made without departing from the technical spirit of the present invention. Accordingly, the scope of the present invention should not be limited by the exemplary embodiments, but should be defined by the appended claims as well as equivalents to the claims.

What is claimed is:

1. An N×N multiple-input multiple-output (MIMO) transceiver comprising:
    a plurality of transceivers, each comprising:
    at least one transceiver circuit;
    an oscillation unit which is configured to generate a differential signal which is supplied to the at least one transceiver circuit;
    a plurality of buffers, which are mounted in a bypass line between the at least one transceiver circuit and the oscillation unit and are configured to amplify and output the differential signal or input and amplify the amplified differential signal; and
    a buffer control unit which is configured to control the plurality of buffers to output or input the amplified differential signal,
    wherein the plurality of buffers comprise an output buffer which is mounted in the bypass line between the at least one transceiver circuit and the oscillation unit and which is configured to output the amplified differential signal, and an input buffer which is connected in parallel with the output buffer and which is configured to input the amplified differential signal,
    wherein, on a path connecting the oscillation unit and the at least one transceiver circuit, a buffer switch is mounted between the output buffer and the input buffer and is configured to turn on and off a connection between the output buffer and the input buffer.

2. The N×N MIMO transceiver as claimed in claim 1, wherein the buffer control unit controls the plurality of buffers to output or input the amplified differential signal depending on whether the oscillation unit operates.

3. The N×N MIMO transceiver as claimed in claim 1, wherein the amplified differential signal is bypassed externally.

4. The N×N MIMO transceiver as claimed in claim 1, wherein the plurality of transceivers are 1×1 MIMO transceivers, respectively, each having one transceiver circuit.

5. The N×N MIMO transceiver as claimed in claim 1, wherein the plurality of transceivers are 2×2 MIMO transceivers, respectively, each having a pair of transceiver circuits.

6. The N×N MIMO transceiver as claimed in claim 1, wherein the input buffer is configured to externally input the amplified differential signal.

7. The N×N MIMO transceiver as claimed in claim 1, wherein the oscillation unit is a voltage-controlled oscillator (VCO), and the VCO of only one of the plurality of transceivers operates.

8. The N×N MIMO transceiver as claimed in claim 7, wherein the buffer control unit of the transceiver in which the VCO operates stops operation of the input buffer of the transceiver in which the VCO operates, and the buffer control units of the other transceivers in which the VCO does not operate stop operation of their respective output buffers.

9. The N×N MIMO transceiver as claimed in claim 8, wherein the differential signal of the VCO is provided to transceiver circuits of the other transceivers in which the VCO does not operate through the output buffer of the transceiver in which the VCO operates and through the input buffer of the transceiver in which the VCO does not operate.

10. The N×N MIMO transceiver as claimed in claim 1, wherein the buffer control unit of the transceiver in which the VCO operates the input buffer and the output buffer of the transceiver in which the VCO operates and turns off the buffer switch of the transceiver in which the VCO operates, and the buffer control units of the remaining transceivers in which the VCO does not operate stop operation of their respective output buffers and turn off their respective buffer switches.

11. The N×N MIMO transceiver as claimed in claim 10, wherein the differential signal of the VCO is amplified through the output buffer and input buffer of the transceiver in which the VCO operates, and provided to the transceiver in which the VCO operates.

12. An N×N multiple-input multiple-output (MIMO) transceiver comprising:
a first MIMO transceiver comprising at least one transceiver circuit, an oscillation unit which is configured to generate a differential signal supplied to the at least one transceiver circuit, and a plurality of buffers which are mounted in a bypass line between the at least one transceiver circuit and the oscillation unit and are configured to amplify and output the differential signal; and
a second MIMO transceiver comprising a buffer which receives the differential signal bypassed by the buffer of the first MIMO transceiver, and at least one transceiver circuit which receives the differential signal from the buffer,
wherein the plurality of buffers comprise an output buffer which is mounted in a bypass line between the at least one transceiver circuit and the oscillation unit and which is configured to configured to output the amplified differential signal, and an input buffer which is connected in parallel with the output buffer and which is configured to input the amplified differential signal,
wherein, on a path connecting the oscillation unit and the at least one transceiver circuit, a buffer switch is mounted between the output buffer and the input buffer and is configured to turn on and off a connection between the output buffer and the input buffer.

13. The N×N MIMO transceiver as claimed in claim 12, wherein the differential signal is amplified before the differential signal is received from the buffer.

* * * * *